(12) United States Patent
Byrne et al.

(10) Patent No.: US 9,824,129 B2
(45) Date of Patent: *Nov. 21, 2017

(54) INFORMATION LANDSCAPE MODELING, ANALYSIS AND VALIDATION

(75) Inventors: Brian P. Byrne, Austin, TX (US); Hayden Marchant, Ramat Bet Shemeseh (IL); Guenter A. Sauter, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 995 days.

This patent is subject to a terminal disclaimer.

(21) Appl. No.: 13/447,572

(22) Filed: Apr. 16, 2012

(65) Prior Publication Data

US 2012/0197654 A1 Aug. 2, 2012

Related U.S. Application Data

(63) Continuation of application No. 12/825,253, filed on Jun. 28, 2010.

(51) Int. Cl.
G06F 17/00 (2006.01)
G06F 17/30 (2006.01)

(52) U.S. Cl.
CPC .............. *G06F 17/30557* (2013.01)

(58) Field of Classification Search
CPC ........... G06F 3/04815; G06F 8/20; G06F 8/70
USPC ........................................ 715/853
See application file for complete search history.

(56) References Cited

U.S. PATENT DOCUMENTS

| 7,603,653 B2 | 10/2009 | Sundararajan et al. |
| 2009/0125796 A1 | 5/2009 | Day et al. |
| 2010/0058287 A1 | 3/2010 | Sundararajan et al. |
| 2011/0320985 A1 | 12/2011 | Byrne et al. |

OTHER PUBLICATIONS

Ge, Guozheng, Rhizome: A Feature Modeling and Generation Platform for Software Product Line, Dissertation, 2008, University of California, Santa Cruz, Santa Cruz, California, United States.
U.S. Patent Application entitled Information Landscape Modeling, Analysis & Validation, U.S. Appl. No. 12/825,253, filed Jun. 28, 2010.
Guozheng GE, et al., Rhizome: A Feature Modeling and Generation Platform for Software Product Line, 2008 23rd IEEE/ACM International Conference on Automated Software Engineering, pp. 375-378, 2008, IEEE, Piscataway, NJ, USA.

*Primary Examiner* — Shawn S Joseph
(74) *Attorney, Agent, or Firm* — Patterson + Sheridan, LLP

(57) ABSTRACT

Managing and validating a project using an information landscape. Embodiments include providing an information landscape including a topology of landscape elements for the project, linking the topology of landscape elements to a plurality of solution artifacts, and validating at least one of the plurality of solution artifacts and semantics of the information landscape.

20 Claims, 9 Drawing Sheets

INFORMATION LANDSCAPE MODELING, ANALYSIS AND VALIDATION

CROSS-REFERENCE TO RELATED APPLICATIONS

This application is a continuation of co-pending U.S. patent application Ser. No. 12/825,253, filed Jun. 28, 2010. The aforementioned related patent application is herein incorporated by reference in its entirety.

BACKGROUND

Field

Embodiments of the invention are generally related to information integration. And more specifically, embodiments are related to techniques for managing and validating an information landscape.

Description of the Related Art

Information integration projects are typically very complex projects which may involve multiple stakeholders, each with different goals and concerns. Furthermore, each of the stakeholders may view the project from a different perspective. In planning the project, the stakeholders may reach a common agreement regarding various solution components of the project. Such an agreement may be memorialized in a document. However, any such document must be constantly maintained throughout the project's lifecycle in order to maintain the document's accuracy. Without this maintenance, the document may quickly become obsolete and contain various inaccuracies and outdated information. However, such maintenance is currently a manual process that requires a significant amount of time and resources and is often a very error-prone process.

SUMMARY

Embodiments of the invention provide a computer-implemented method, computer program product, and system for providing an information landscape for a project, wherein the information landscape comprises a topology of topology elements representing aspects of the project, and wherein the topology elements are selected from a palette of landscape elements. The computer-implemented method, computer program product and system comprise linking each topology element to a respective one or more solution artifacts from a plurality of solution artifacts for the project. Additionally, the computer-implemented method, computer program product and system comprise validating, by operation of one or more computer processors, at least one of: (i) the plurality of solution artifacts for the project; (ii) semantics of the information landscape based on the topology of topology elements; and (iii) semantics of the linking between each of the topology elements in the topology and the one or more solution artifacts.

Yet another embodiment of the invention provides a computer-implemented method for providing an information landscape for a project, wherein the information landscape comprises a topology of topology elements representing aspects of the project, and wherein the topology elements are selected from a palette of landscape elements. The method includes linking each topology element to a respective one or more solution artifacts from a plurality of solution artifacts for the project. Additionally, the method includes linking each topology element to a respective one or more requirements from a plurality of requirements for the project. The method also includes validating at least one topology element in the topology by operation of one or more computer processors, including determining an adequacy value for the one or more linked solution artifacts from the plurality of solution artifacts of the project. The method further includes displaying the topology, including generating a solution sketch based on the topology, wherein the solution sketch comprises a graphical representation of the information landscape for the project; and displaying the solution sketch based on a viewpoint associated with the topology.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
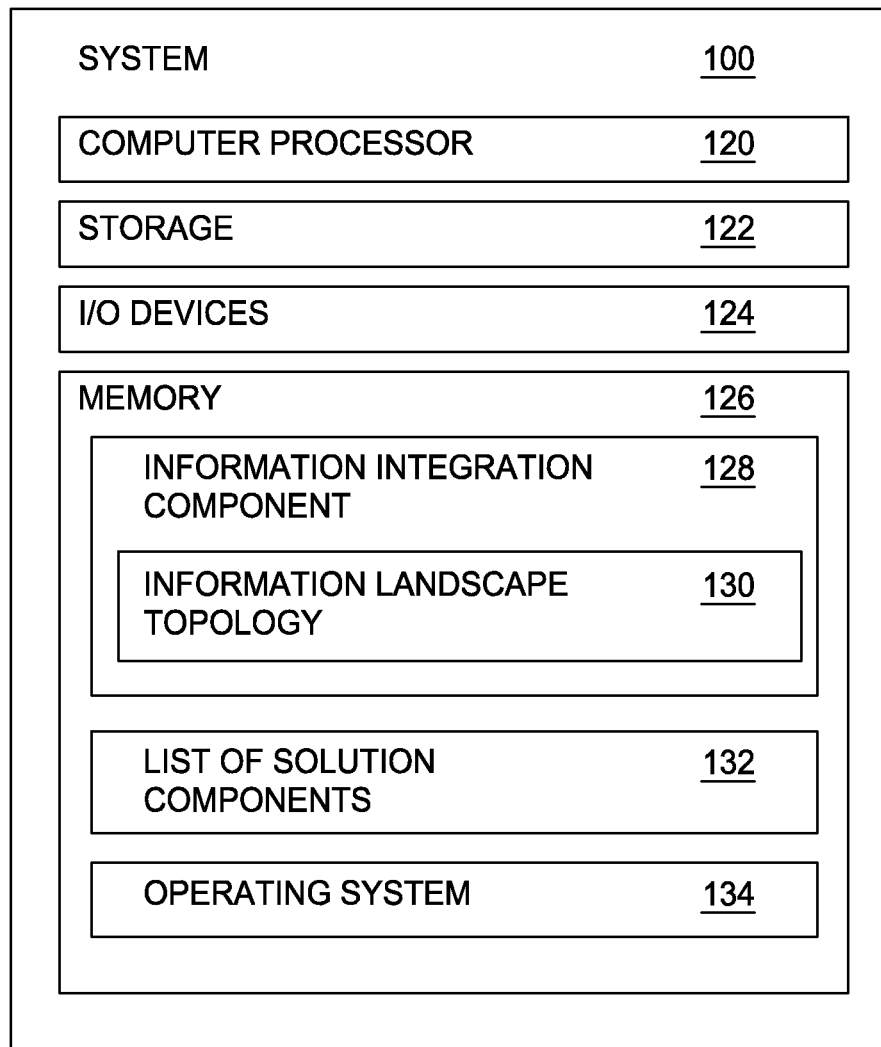
FIG. 1 is a block diagram of components of a computer system configured to run an information integration component, according to one embodiment of the invention.

Information integration projects are often very complex projects involving multiple stakeholders with different perspectives and different objectives. Large projects may also bring together a wide range of technical platforms, each with their own tools, capabilities and degrees of metadata management and reporting. As a result, the stakeholders will typically each have a fragmented view of the solution landscape. One embodiment of the invention provides an information landscape topology containing topology elements. Each of the topology elements may be linked to one or more solution components. A validation component may then validate the topology and the solution components. In one embodiment, a displayable solution sketch may be generated based on the topology. The solution sketch may be generated further based on a specified viewpoint.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of components of a computer system configured to run an information integration component, according to one embodiment of the invention. As shown, FIG. 1 includes a computer system 100. The computer system 100 contains a computer processor 120, storage media 122, I/O devices 124 and memory 126. Computer processor 120 may be any processor capable of performing the functions described herein. I/O devices 124 may represent a variety of input and output devices, including keyboards, mice, visual displays, printers and so on. Furthermore, as will be understood by one of ordinary skill in the art, any computer system capable of performing the functions described herein may be used.

In the pictured embodiment, memory 126 contains an information integration component 128, a list of solution components 132 and an operating system 134. Although memory 126 is shown as a single entity, memory 126 may include one or more memory devices having blocks of memory associated with physical addresses, such as random access memory (RAM), read only memory (ROM), flash memory or other types of volatile and/or non-volatile memory. The information integration component 128 may contain an information landscape topology 130. The topology 130 may include a representation of an information landscape or information project. Additionally, the information landscape topology 130 may represent the information project from a particular viewpoint. The operating system 134 may be any operating system capable of performing the functions described herein.

The list of solution components 132 may contain one or more solution components used in the information project. Generally, the solution components in the list of solution components 132 may include any component used in an information project. In one embodiment, multiple separate topologies 130 may share a single list of solution components 132. In another embodiment, each topology 130 is associated with a dedicated corresponding list of solution components 132.

In one embodiment, exemplary solution components include physical metadata structures, such as extract, transform and load (ETL) job designs, deployed database schemas, and federated queries. Additionally, exemplary solution components may include model structures, such as logical data models, dimensional models, physical data models, and mapping specifications. Furthermore, exemplary solution components may include business definitions, such as requirements specifications, ontology elements, taxonomy elements or other business definitions. Exemplary solution components in the list of solution components 132 may also include operation structures, such as ETL job runs and ETL events. Of course, the above-listed embodiments of solution components are merely for illustrative purposes, and one of ordinary skill in the art will recognize that the solution components may represent other similar known and unknown components.

The information integration component 128 may generally construct, maintain and validate an information landscape topology 130. In one embodiment, the information landscape topology 130 contains a high-level representation of the information project. In addition, the topology 130 may represent the information project in various ways and from a variety of different viewpoints. For example, a network engineer using the information integration component 128 may view the topology 130 for the information project from a networking viewpoint, which may emphasize various networking devices and connections used in the information project. As another example, a sales executive using the information integration component 128 may view the topology 130 from a sales viewpoint, which may emphasize sales and customer information. In other words, different information in the topology may be shown and emphasized in the topology, based on which viewpoint is used to view the topology 130. As a result, multiple users, as well as multiple types of users (e.g., engineers, executives, etc.), may share a single topology model, but may still view the topology from a viewpoint that emphasizes information relevant to the user.

The information landscape topology 130 may also contain, for each element in the topology 130, one or more links to solution components from the list of solution components 132. For example, a "Customer Information" element in the topology 130 may map to a plurality of solution components from the list of solution components 132, such as databases storing customer information, database tables in the databases containing customer information, and web applications for updating the customer information in the database tables. By linking the topology elements to one or more solution components, the topology elements are thus associated with dynamic values that may be updated as the project evolves. Additionally, the information integration component 128 may perform validation on the information landscape topology 130, the list of solution components 132, and on the various links from elements in the topology 130 to one or more solution components. The validation may ensure not only the accuracy of these components and links, but also may determine whether certain business metrics can be met. The validation is described in more detail in FIG. 3 and the related discussion.

Figure 2A:
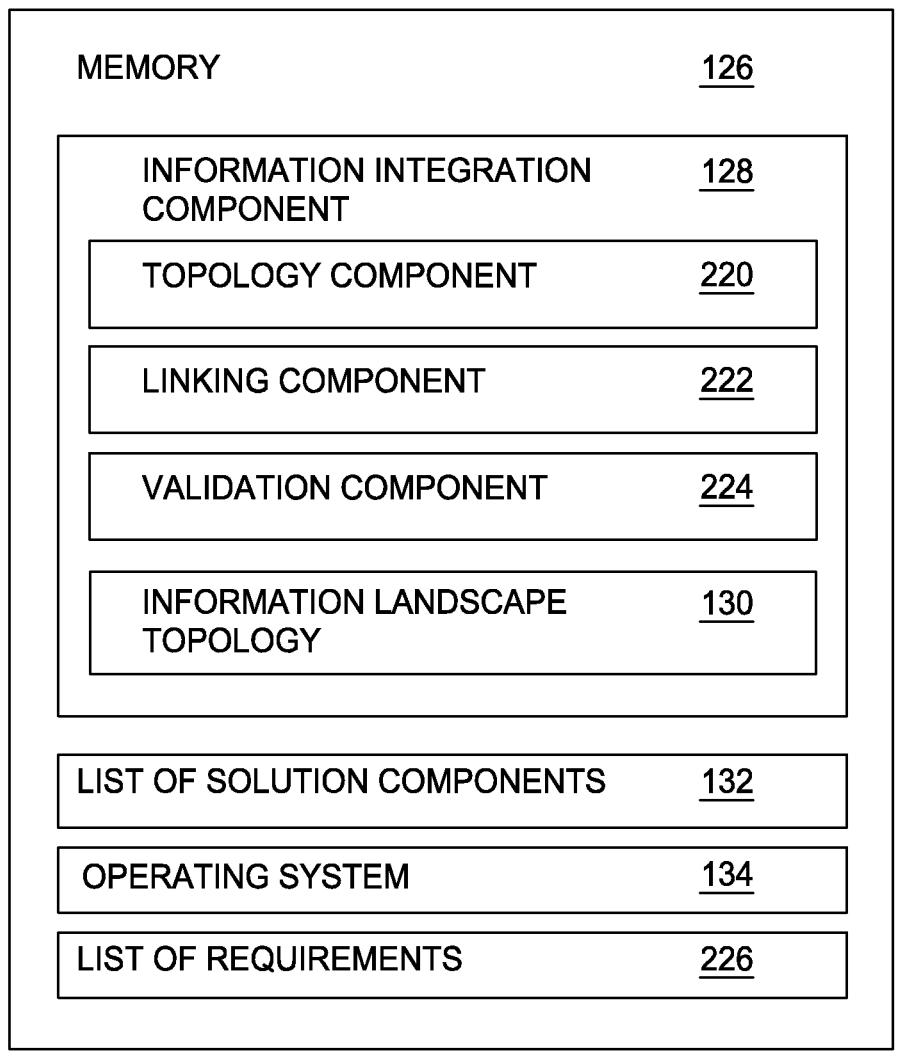
FIGS. 2A-2B are block diagrams of exemplary embodiments of the computer memory of the computer system of FIG. 1.
Figure 2B:
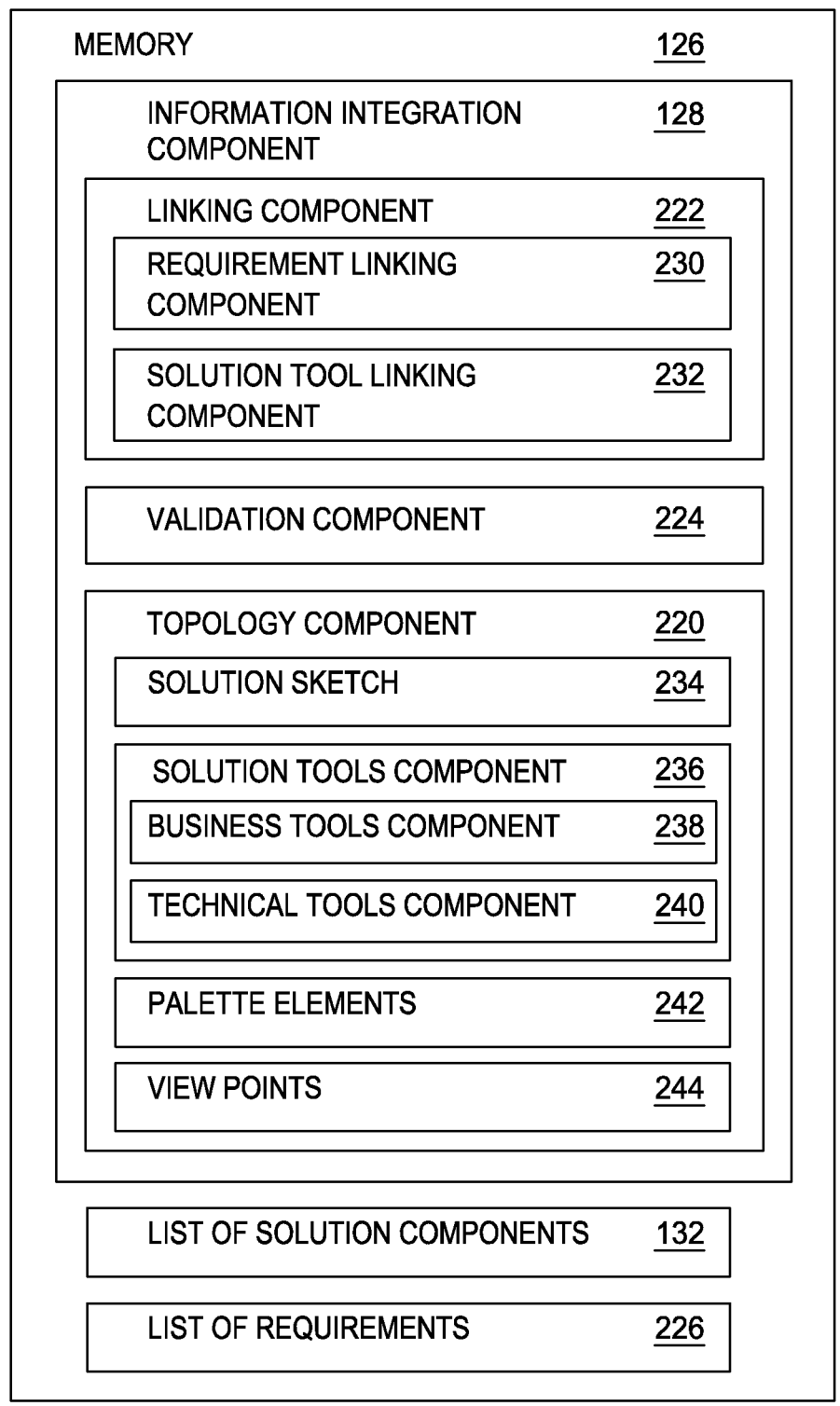

FIGS. 2A-2B are block diagrams of exemplary embodiments of the computer memory of the computer system of FIG. 1. As shown, FIG. 2A represents a first embodiment of a computer memory 126. The memory 126 includes an information integration component 128, a list of solution components 132, an operating system 134, and a list of requirements 226. The information integration component 128 further includes a topology component 220, a linking component 222, a validation component 224 and an information landscape topology 130. The topology component 220 may generally generate and maintain the information landscape topology 130.

In one embodiment, for instance, a user may use the topology component 220 to generate a new topology 130. The user may further use the topology component 220 to generate new palette elements and add these elements to the topology 130. As used herein, palette elements are generally landscape elements that may be added to one or more topologies 130. For example, one exemplary palette element may be a "Customer Information" element, which may be added to a topology 130 representing an online shopping website. Furthermore, as defined herein, once a palette element is added to a topology, the instance of the element in the topology is referred to as a topology element. Thus, as an example, adding a particular palette element to two separate topologies 130 will produce two distinct topology elements: one represented by the instance of the palette element in the first topology, and a second represented by the instance of the palette element in the second topology.

The information integration component 128 also contains a linking component 222. The linking component 222 may generally create and maintain links between elements in a topology 130 and one or more solution components from the list of solution components 132. Continuing the above example, once the "Customer Information" palette element is added to a topology 130, the element in the topology may be linked, using the linking component 222, with one or more solution components that relate to customer information. For instance, the "Customer Information" element in the topology 130 may be linked to a database storing customer data, as well as a webpage used to create and modify data in the database. In this example, both the database and the webpage may be represented as solution components in the list of solution components 132. Furthermore, the linking component 222 may also link topology elements with one or more requirements from the list of requirements 226. In one embodiment, multiple separate topologies 130 may share a single list of requirements 226. In another embodiment, each topology 130 is associated with a dedicated corresponding list of requirements 226.

Additionally, in the pictured embodiment, the information integration component 120 contains a validation component 224. The validation component 224 may generally be used to perform validation operations on other elements of the system. In one embodiment, the validation component 224 may be used to validate the accuracy and existence of solutions in the list of solution components 132. In another embodiment, the validation component 224 may validate the information landscape topology 130. Validation of the topology 130 may include validating not only the elements of the topology 130, but also any links between the topology elements and the solution components.

FIG. 2B is a block diagram of a second embodiment of the computer memory of the computer system of FIG. 1. As shown, FIG. 2B shows an exemplary computer memory 126 containing an information integration component 128. The information integration component 128 contains a linking component 222, a validation component 224 and a topology component 220. The linking component 222 further contains a requirement linking component 230 and a solution tool linking component 232. The solution tool linking component 232 may link topology elements in the information landscape topology 130 with one or more solution components in the list of solution components 132. The requirement linking component 230 may link topology elements with one or more requirements from the list of requirements 226. For instance, one requirement in the list of requirements 226 may be that customer information must be saved for at least one year after the customer completes a transaction. Thus, continuing with the above example, a user may use the requirement linking component 230 to link the "Customer Information" topology element with the requirement that customer data be saved for at least one year after the customer completes the transaction.

As shown, the topology component 220 further contains a solution sketch 234, a solution tools component 236, a collection of palette elements 242 and viewpoints 244. The topology component 220 may be used to generate and manage the collection of palette elements 242. Continuing the above example, a user may have used the topology component 220 to generate the palette element of "Customer Information." Once the element is generated, the topology component 220 may add the element to the collection of palette elements 242. The palette element 242 may then be added to one or more topologies 130. For example, the "Customer Information" palette element may be added to two different topologies 130, and each instance of the topology element may then be linked to a different set of both solution components 132 and requirements 226.

In one embodiment, the solution sketch 234 is a graphical representation of the information landscape topology 130. The solution sketch 234 may be generated by the topology component 220. Additionally, the solution sketch 234 may be displayed using one or more I/O devices 124 in the system 100. In one embodiment, the topology component 220 generates multiple solution sketches 234, with each solution sketch 234 representing the topology 130 according to a different viewpoint 244. For example, a solution sketch 234 generated for display to a network engineer (using a first viewpoint) may be different from a solution sketch 234 generated for display to a sales executive (using a second viewpoint). Thus, the two solution sketches 234 may be completely different from one another because they are generated using different viewpoints, even though both solution sketches 234 represent the same information landscape topology 130.

In the pictured embodiment, the solution tools component 236 further contains a business tools component 238 and a technical tools component 240. The business tools component 238 may generally be used to create and modify business components. For example, a user may use the business tools component 238 to generate a new business requirement for a project. Once the requirement is created, the business tools component 238 may add the new requirement to the list of requirements 226. The business tools component 238 may also be used to create business metrics, which may be used in validation of the project performed by the validation component 224.

Additionally, the technical tools component 240 may be used to create and modify solution components. For example, a user may use the technical tools component 240 to generate a new solution component. Once the solution component is created, the technical tools component 240 may add the solution component to the list of solution components 132. Additionally, the technical tools component 240 may create and manage viewpoints 244. Furthermore, the technical tools component 240 may be used to create a new viewpoint 244 and associate the viewpoint 244 with a particular user. In one embodiment, the technical tools component 240 may associate viewpoints 244 with a particular class of users. For example, the technical tools component 240 may generate a "NetAdmin" viewpoint, which may be used to generate a solution sketch 234 that emphasizes networking devices and their connections. The technical tools component 240 may then associate the viewpoint with user "John Smith." Continuing this example, the technical tools component 240 may further associate the viewpoint with the group of users "Network Administrators," which contains all the users involved in the project that are network administrators. As such, when John Smith (or any user that is a network administrator) requests the topology component 220 generate a solution sketch 234 for the topology 130, the generated solution sketch 234 will reflect the project with an emphasis on networking devices and connections.

Figure 3:
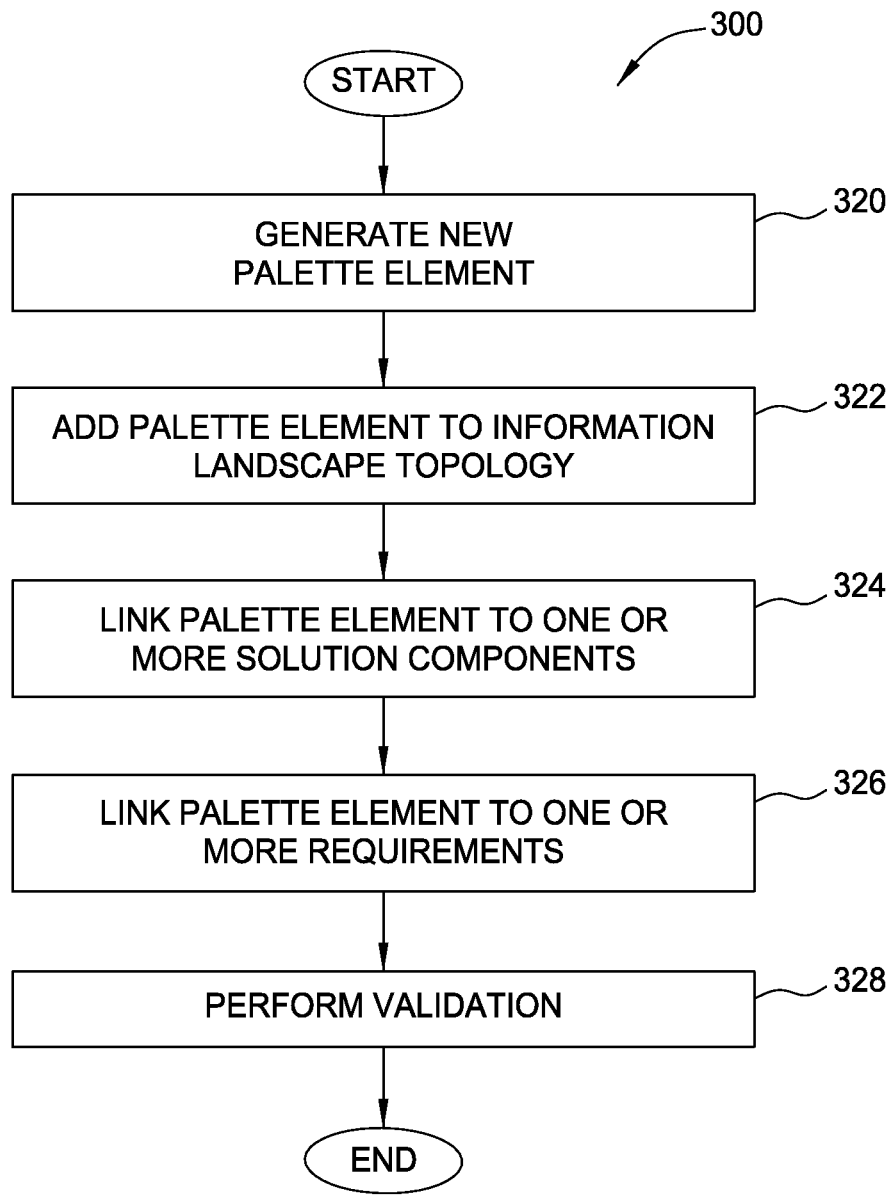
FIG. 3 is a flow diagram illustrating a method of generating and validating a topology, according to one embodiment of the invention.

FIG. 3 is a flow diagram illustrating a method of generating and validating a topology, according to one embodiment of the invention. As shown, the method 300 begins at step 320, where the topology component 220 generates a new palette element 242. For example, as discussed above, a user may use the topology component 220 to generate the "Customer Information" palette element 242. The topology component 220 may then add the palette element 242 to an information landscape topology 130 (step 322). In one embodiment, the palette element 242 may further be added to multiple different topologies 130 representing separate projects. For example, the "Customer Information" palette element 242 may be added to a first topology 130 representing an online shopping website, and also added to a second topology 130 representing a utility service.

Once the palette element 242 has been added to a topology 130, the instance of the palette element in the topology 130 is then linked to one or more solution components 132 (step 324). In one embodiment, the linking is performed using the solution tool linking component 232. Continuing the example, the two instances of the "Customer Information" palette element 242 in the two topologies 130 (i.e., the topology for the online shopping website and the topology for the utility service) may be linked to completely separate requirements 226 and solution components 132. That is, because the online shopping website and the utility service will likely have different solution components (e.g., databases, network devices, etc.) and different business requirements, the two instances of the "Customer Information" element 242 may be linked to entirely different structures within each of the respective topologies 130.

Once the topology element has been linked to one or more solution components, the topology element is then linked with one or more requirements (step 326). In one embodiment, this linking is performed using the requirement linking component 230. As noted above, in one embodiment, a particular palette element 242 may be added to multiple topologies 130. Furthermore, in one embodiment, each instance of the palette element 242 (i.e., the corresponding topology element in each of the different topologies 130) may be linked to different requirements from the list of requirements 226. Furthermore, if each of the different topologies 130 uses a different list of requirements 226, the separate instances of the palette element 242 may be linked not only with different requirements, but different requirements from different lists of requirements 226.

As shown, the validation component 224 then performs a validation operation (step 328). Generally, the validation component 224 may validate different elements representing entities in the information project. In addition, the validation component 224 may notify a user of the results of the validation, including any problems or warnings that were detected. For example, in one embodiment, the validation component 224 may validate an information landscape topology 130. As an example, the validation component 224 may perform syntactical validation, such as verifying the syntax of the topology 130. Additionally, exemplary validation may include validating any links associated with the topology that relate topology elements in the topology 130 to one or more solution components 132 and requirements 226. Furthermore, the validation may include more advanced calculations, such as determining, for all paths and connections between topology elements in the topology 130, which of these paths can be technically realized at the physical level. For example, a user may create a topology 130 showing a "Customer Information" element communicating directly with a "Store Inventory" element. Furthermore, in this example, the user may link the "Customer Information" topology element with a first database, and link the "Store Inventory" topology element with a second database. However, if the two databases are unable to directly communicate with each other (e.g., if they are on separate computer systems with no network path in between), the validation component 224 may detect this problem while performing the validation. The validation component 224 may then report its findings to the user.

The validation component 224 may also validate the topology 130 to determine the completeness of the business definition. In one embodiment, the validation component 224 may analyze the topology 130 to determine what assets (or percentage of assets) in the topology are linked to adequate solution components 132 and requirement definitions 226. For example, a "Customer Information" element in an exemplary topology 130 may be linked to a solution component 132 representing a webpage for submitting customer data, and may additionally be linked to a requirement 226 specifying that customer information must be stored for at least one year after the customer completes a transaction. As part of performing the validation, the validation component 224 may determine that, in this example, the "Customer Information" topology element is linked to inadequate solution components 132, because the element is not linked with any solution components 132 capable of satisfying the requirement (i.e., the element is not linked with a "storage" component). Upon determining that the element is linked with inadequate solution components 132, the validation component 224 may notify the user of its findings. In one embodiment, the validation component 224 (or another component of the system 100) may also prompt the user with one or more suggested actions for remedying the inadequacy. The validation component 224 may prompt the user with a list of solution components from the list of solution components 132 that may be linked to the "Customer Information" element in order to cure the inadequacy. Thus, in this example, the validation component 224 may prompt the user with one or more available storage solution components.

Additionally, the validation component 224 may calculate, as part of the validation, one or more business metrics for the topology. For example, an exemplary information landscape topology 130 may express a means to support a business metric (such as Customer Profitability). In this example, the validation component 224 may determine, as part of the validation, to what degree these metrics may be technically realized, given the elements in the topology 130, their connections with one another, and their individual links to one or more solution components 132 and requirements 226. Additionally, the validation component 224 may calculate an estimated time indicating approximately when elements in the topology (and their respective linked solution components 132 and requirements 226) will be completely supported. For example, assume an exemplary topology 130 is created before all elements of the information project have been completed, and that the exemplary topology 130 contains a "Customer Information" topology element linked to a website solution component and a database solution component. In this example, the website solution component may include a completion time of 6 months, and the database solution component a completion time of 3 months. Thus, in this example, the validation component 224 may determine that it will be 6 months until the "Customer Information" element is completely supported.

As a second example, the database solution component may include a completion time of 3 months, and the website solution component may include a completion time of 6 months after the completion of the database solution component 132. In this example, the validation component 224 may determine that it will be 9 months until the "Customer Information" element is completely supported. Of course, these examples are for illustrative purposes only, and one of ordinary skill in the art will recognize that other techniques for estimating and calculating a time until completion may be used instead. Additionally, the above examples of exemplary validations are not meant to be limiting, but rather are intended for illustrative purposes. The validation component 224 may of course perform other validations on these and other elements of the project.

Figure 4:
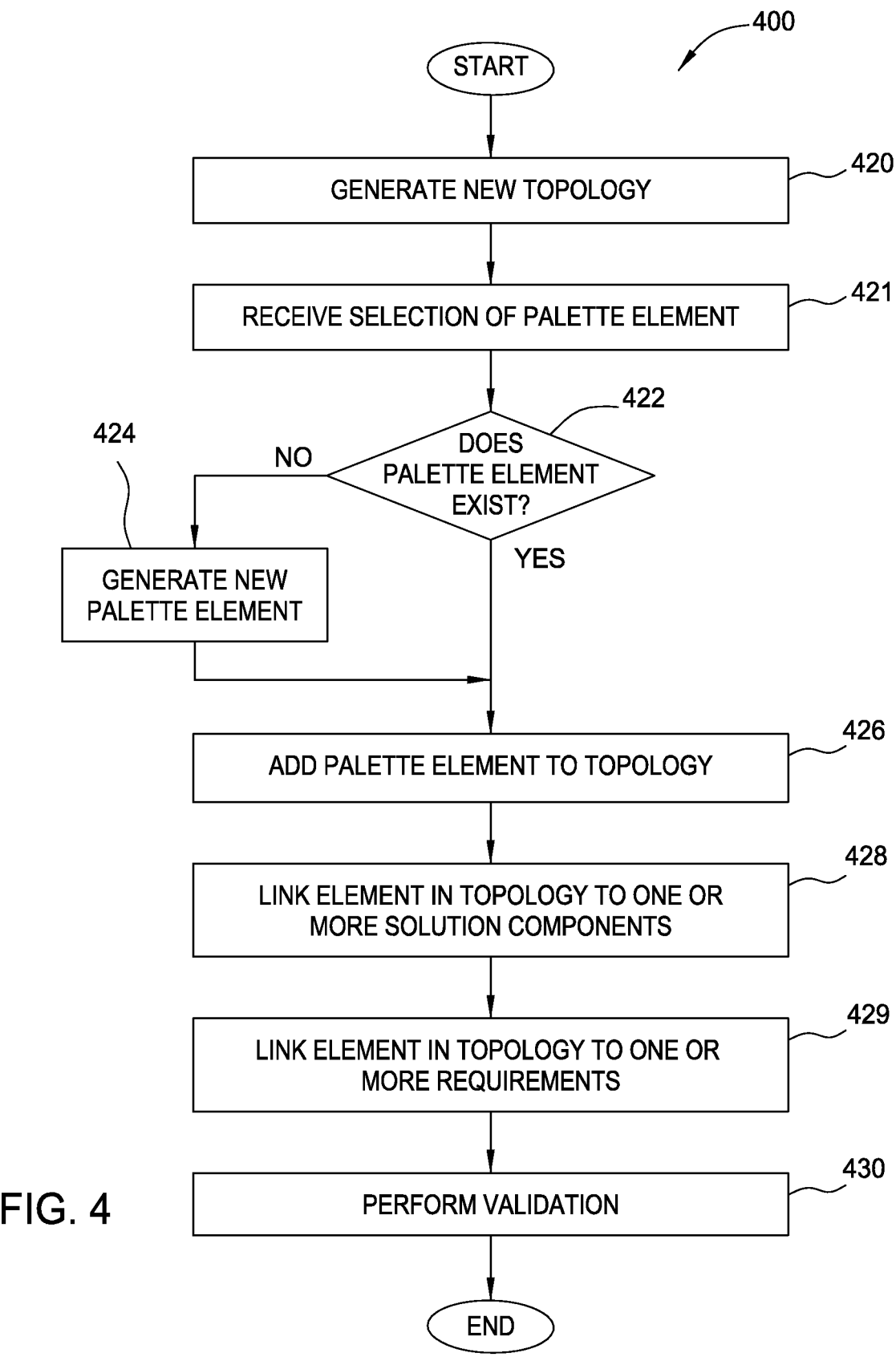
FIG. 4 is a flow diagram illustrating a method of generating and validating a topology, according to one embodiment of the invention.

FIG. 4 is a flow diagram illustrating a method of generating and validating a topology, according to one embodiment of the invention. As shown, the method 400 begins at step 420, where the topology component 220 generates a new topology 130. For example, the topology component 220 may generate the topology 130 in response to receiving a user request for a new topology 130. Once the topology has been generated, the topology component 220 receives a selection of a palette element 242 (step 421). Continuing the above example, the user may choose a palette element 242 to add to the topology from a list of palette elements 242 displayed using a user interface. Once the palette element selection is received, the topology component 220 determines whether the palette element already exists (step 422). For example, if, as in the above example, the user selects the palette element 242 from a list of elements displayed on a user interface, the topology component 220 may determine that the element already exists. However, if instead the user selected the element by using, for example, a "New Palette Element" button on the user interface, the topology component 220 may determine that the palette element does not exist. In this case, the topology component 220 generates a new palette element 242 (step 424). In one embodiment, the new palette element 242 is generated based on input received from the user. For example, a user may specify that the topology component 220 should generate a new palette element named "Customer Information."

Once the topology component 220 determines the selected palette element 242 exists (step 422), or alternatively once the topology component 220 generates the new palette element 242 (step 424), the topology component 220 adds the palette element 242 to the newly generated topology 130 (step 426). Upon adding the palette element 242 to the topology 130, the linking component 222 links the topology element (i.e., the instance of the newly-added palette element 242 in the topology 130) with one or more solution components from the list of solution components 132 (step 428). In one embodiment, the linking is performed by the solution tool linking component 232. The linking component 222 may then link the topology element with one or more requirements from the list of requirements 226 (step 429). In one embodiment, this is performed by the requirement linking component 230. Once the topology element is linked with one or more requirements, the validation component 224 validates the topology (step 430). Upon completing the validation, the method 400 ends.

Figure 5:
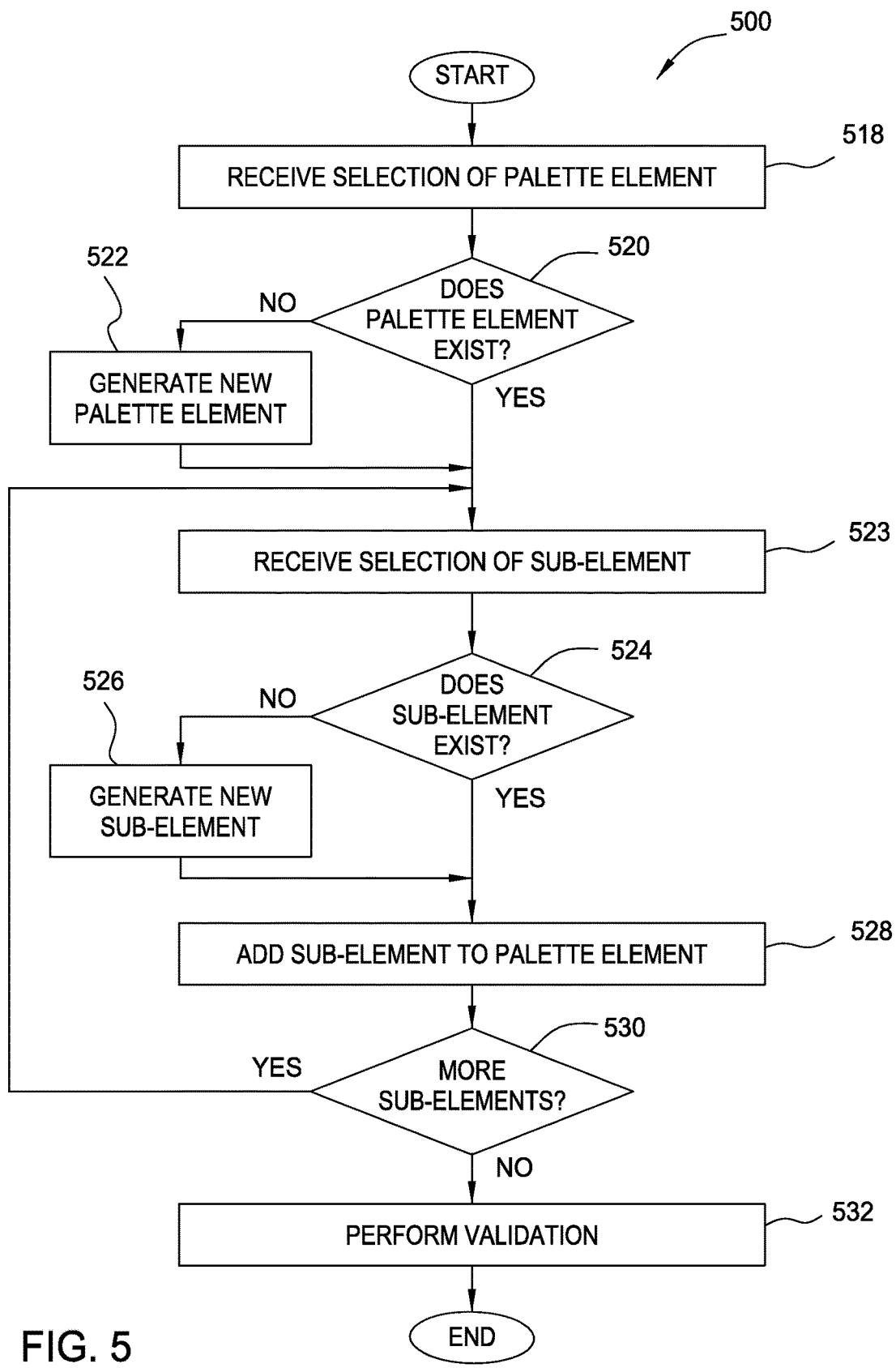
FIG. 5 is a flow diagram illustrating a method of generating a palette element for use in a topology, according to one embodiment of the invention.

FIG. 5 is a flow diagram illustrating a method of generating a palette element for use in a topology, according to one embodiment of the invention. As shown, the method 500 begins at step 518, where the topology component 220 receives a selection of a palette element 242. The topology component 220 then determines whether the palette element 242 currently exists (step 520). If the topology component 220 determines the selected element 242 does not exist, the component 220 generates a new palette element and adds the newly generated element to the list of palette elements 242 (step 522).

Once the palette element is generated (step 522), or if the topology component determines the palette element already exists (step 520), the topology component 220 receives a selection of a sub-element to add to the palette element (step 523). Generally, sub-element may refer to a sub-section of the portion of an information project represented by a palette element. For example, a "Customer Information" palette element may further contain two sub-elements: a "Customer Information Interface" sub-element and a "Customer Information Storage" sub-element. Furthermore, when a palette element is added to a topology 130, any sub-elements contained in the palette element may be added to the topology 130 as well. In addition, once added to the topology, these sub-elements may be linked (e.g., by the linking component 222), similar to a topology element, to one or more solution components 132 and one or more requirements 226.

Upon receiving the selection of the sub-element, the topology component 220 determines whether the selected sub-element currently exists (step 524). Thus, as a first example, a user may select an existing sub-element from a list of sub-elements displayed in a user interface. In the first example, the topology component 220 may determine that the selected sub-element already exists. As a second example, a user may select an "Add New Sub-Element" button in the user interface. In the second example, the topology component 220 may determine the selected sub-element does not exist, and proceed to generate the new sub-element (step 526). The topology component 220 may generate the new sub-element based on input received from the user.

Once the topology component 220 determines the sub-element exists (step 524), or once the topology component 220 generates the new sub-element (step 526), the topology component 220 adds the new sub-element to the palette element (step 528). As an example, a user may specify a new "Customer Information" palette element, and further specify a "Customer Information Storage" sub-element. The topology component 220 may create both the palette element and the sub-element, and then add the newly-created sub-element to the palette element. Once the sub-element is added to the palette element, the topology component 220 determines if there are more sub-elements to add to the palette element (step 530). In one embodiment, this determination is made based on a response received from the user. For instance, the topology component 220 may simply query the user and ask whether the user wishes to add more sub-elements to the palette element. In this example, the topology component 220 may then make the determination of step 530 based on a response from the user.

In any event, if the topology component 220 determines there are more sub-elements to add to the palette element, the loop begins again at step 523, where the topology component 220 receives a selection of another sub-element. If, instead, the topology component 220 determines there are no more sub-elements to add, the validation component 224 proceeds to validate the palette element and any included sub-elements. Once the validation is complete, the method 500 ends.

Figure 6:
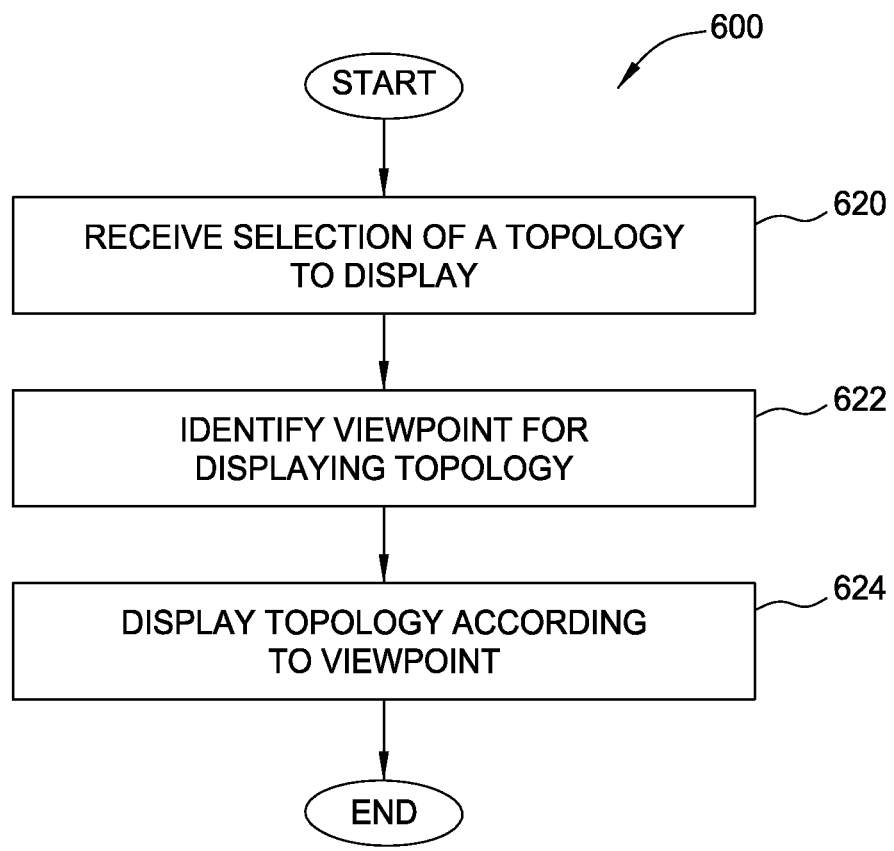
FIG. 6 is a flow diagram illustrating a method of displaying a topology, according to one embodiment of the invention.

FIG. 6 is a flow diagram illustrating a method of displaying a topology, according to one embodiment of the invention. As shown, the method 600 begins at step 620, where the topology component 220 receives a selection of a topology 130 to display. For example, an exemplary information integration component 128 may contain multiple information landscape topologies: one for an online shopping website, and a second for a utility service. In this example, a user may indicate (e.g., through a select operation performed using a user interface) that he wishes to view the topology for the online shopping website.

Once the topology component 220 receives the selection of the topology, the component 220 identifies a viewpoint 244 for displaying the topology 130 (step 622). As explained above, a single topology 130 may be represented in multiple different ways, based on the viewpoint 244 from which the topology is displayed. Continuing the above example, the topology 130 for the online shopping website may be associated with two viewpoints: one viewpoint for network engineers, and a second viewpoint for sales executives. If a solution sketch 234 is created for the topology 130 using the viewpoint for sales executives, the solution sketch 234 may simply show a high-level representation of all the topology elements in the topology. Conversely, if the solution sketch 234 is created using the viewpoint for network engineers, the solution sketch 234 may include additional details about the networking connections and devices used in the information project. Thus, two solution sketches 234 created for the same topology 130 may differ, depending on the viewpoints 244 used in creating each of the solution sketches 234.

The topology component 220 may identify a viewpoint 244 to use in displaying the topology 130 based on a user selection of a viewpoint 244. Thus, in one embodiment, the user may simply select a viewpoint 244 (e.g., from a list of viewpoints displayed in a user interface) for use in generating a solution sketch 234 for the topology 130. In another embodiment, the viewpoint 244 may be identified based on the credentials of the user. For example, if a user belongs to a networking user group, the topology component 220 may determine that the viewpoint for network engineers should be used. In yet another embodiment, users may specify a default viewpoint to use in viewing topologies in a user profile. For example, a particular user may specify that he wishes to view topologies by default using the sales executive viewpoint. Thus, in this embodiment, even if the particular user is a member of the networking user group, the sales executive viewpoint will be used when the user requests to view a topology.

Once the viewpoint is identified, the topology component 220 generates a solution sketch 234 for the topology 130 using the identified viewpoint 244, and displays the generated solution sketch 234 (step 624). In one embodiment, the topology component 220 may also store the solution sketch 234 as an image file on storage media 122. The generation and storage of the image file may be, for example, in response to a user request. For instance, once the solution sketch 234 is displayed, the user may request an image file be generated (e.g., by clicking a "Save as Image . . . " button in the user interface). In another embodiment, the topology component 220 may generate an image file representing the solution sketch 234 in lieu of displaying the solution sketch 234. Once the solution sketch 234 is displayed, the method 600 ends.

Figure 7:
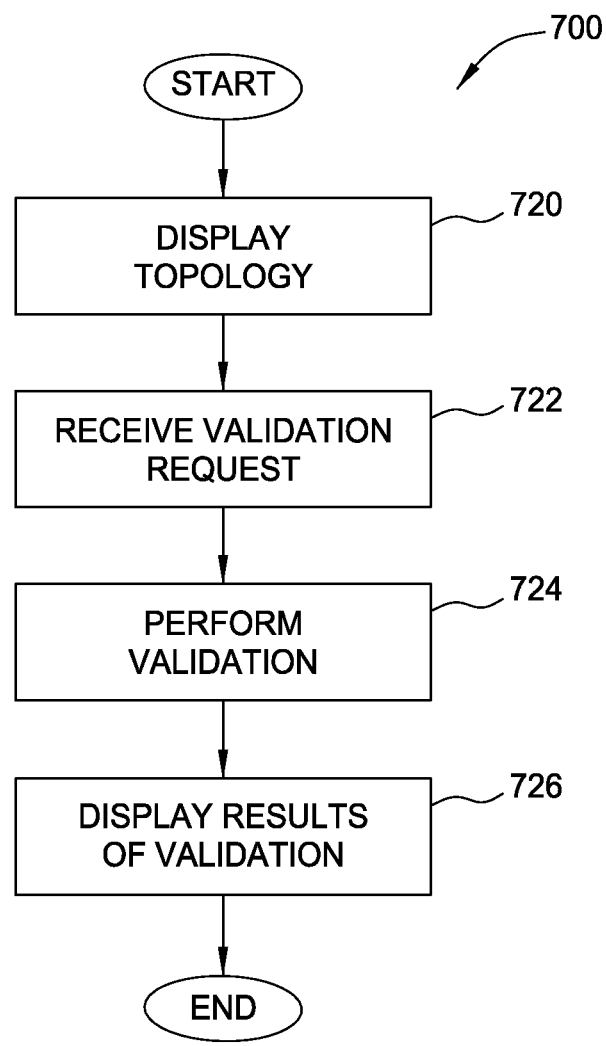
FIG. 7 is a flow diagram illustrating a method of displaying results of a validation operation, according to one embodiment of the invention.

FIG. 7 is a flow diagram illustrating a method of displaying results of a validation operation, according to one embodiment of the invention. As shown, the method 700 begins at step 720, where the topology component 220 displays a solution sketch 234 generated for a topology 130. In one embodiment, the solution sketch 234 may be generated and displayed using method 600. Once the solution sketch 234 representing the topology 130 is displayed, the validation component 224 receives a validation request (step 722). For example, a user interface used for displaying the solution sketch may include a "Validate Topology" button which, if pressed, submits a validation request.

Upon receiving the validation request, the validation component 224 validates the topology (step 724). The validation may be any validation operation described herein, including, but not limited to, syntax validation, adequacy of solution components validation, physical possibility validation and business metric validation. Once the validation is complete, the validation component 224 displays the results of the validation (step 726). As an example, if the validation component 224 determines (at step 724) that a "Customer Information" topology element is linked to inadequate solution components because the topology element is not linked to a storage solution component (e.g., a database), the validation component 224 may alert the user to this inadequacy. Additionally, the validation component 224 may suggest actions that the user may take to remedy the inadequacy. Continuing the above example, the validation component 224 may suggest that the user link the "Customer Information" topology element with one or more storage solution components. In one embodiment, the validation component 224 may further present the user with a list of storage solution components from the list of solution components 132. The user may then select one of the storage solution components, and in response to the selection, the linking component 222 may link the "Customer Information" topology element with the selected storage solution component. The validation component 224 may then perform a second validation operation on the topology, and notify the user that the inadequacy has been remedied. Once the results of the validation are displayed, the method 700 ends.

Figure 8:
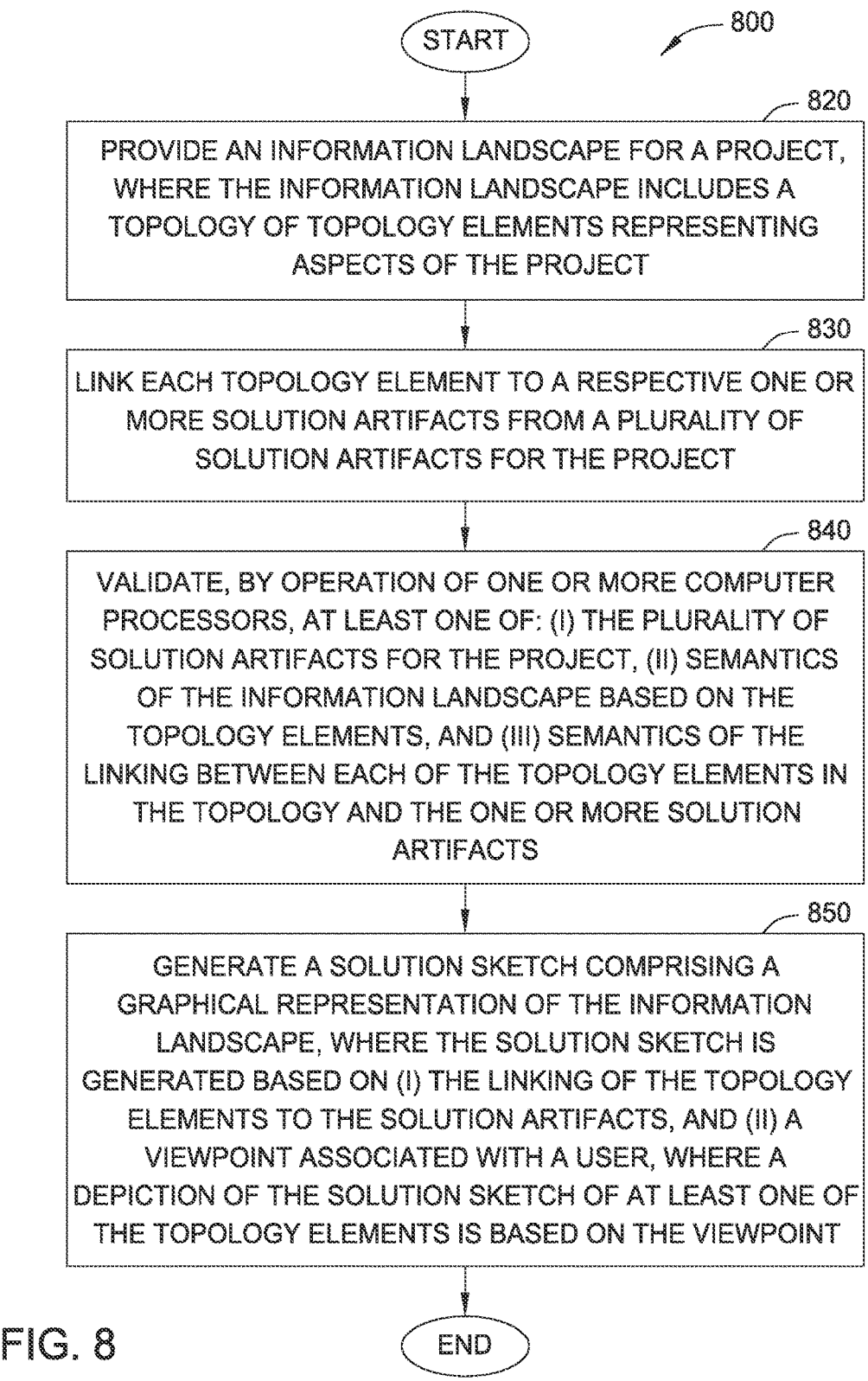
FIG. 8 is a flow diagram illustrating a method of generating a solution sketch, according to one embodiment of the invention.

FIG. 8 is a flow diagram illustrating a method of generating a solution sketch, according to one embodiment of the invention. As shown, the method 800 begins at block 820, where the information integration component 128 provides an information landscape for a project. The information landscape includes a topology of topology elements representing aspects of the project. The information integration component 128 links each topology element to a respective one or more solution artifacts for the project (block 830). The information integration component 128 validates at least one of: (i) the plurality of solution artifacts for the project, (ii) semantics of the information landscape based on the topology elements, and (iii) semantics of the linking between each of the topology elements in the topology and the one or more solution artifacts (block 840). The information integration component 128 generates a solution sketch comprising a graphical representation of the information landscape, where the solution sketch is generated based on (i) the linking of the topology elements to the solution artifacts, and (ii) a viewpoint associated with a user, where a depiction of the solution sketch of at least one of the topology elements is based on the viewpoint (block 850), and the method 800 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to provide an information landscape for topology modeling, linking, and validation for an information integration project, the information landscape comprising a topology of topology elements representing aspects of the information integration project, the computer-implemented method comprising:
   providing an information integration program comprising a plurality of components including a topology component, a linking component, and a validation component;
   generating the topology by the topology component and based on a palette of landscape elements;
   linking, by the linking component, each topology element to a respective one or more solution artifacts from a plurality of solution artifacts for the information integration project, wherein the plurality of solution artifacts includes at least one of a database, a logical data model for a database, and a database schema;
determining, by the validation component when executed by one or more computer processors, a degree to which one or more business metrics are realizable, wherein the one or more business metrics are generated by the validation component based on: (i) the plurality of solution artifacts for the information integration project; (ii) the information landscape; and (iii) the linking between each of the topology elements in the topology and the one or more solution artifacts;
upon receiving a request from a user to generate a solution sketch for the information landscape, determining a class of users to which a user is assigned, based on an electronic user identifier corresponding to the user;
determining a viewpoint having a predefined association with the class of users to which the user is assigned;
selecting only a portion of the plurality of solution artifacts to depict, based on the viewpoint having a predefined association with the class of users to which the user is assigned;
automatically generating the solution sketch for the user, the solution sketch comprising a graphical representation of the information landscape, wherein the solution sketch includes depictions of solution artifacts for the selected portion of the plurality of solution artifacts, wherein the solution sketch is generated based on: (i) the linking of the topology elements to the solution artifacts, and (ii) the viewpoint having the predefined association with the class of users to which the user is assigned; and
outputting the solution sketch for display to the user.

2. The computer-implemented method of claim 1, further comprising:
linking each topology element to a respective one or more requirements from a plurality of requirements for the information integration project.

3. The computer-implemented method of claim 1, wherein the topology elements are selected from the palette of landscape elements, wherein a first landscape element of the palette of landscape elements contains one or more sub-elements.

4. The computer-implemented method of claim 1, further comprising:
for at least one topology element in the topology, determining an adequacy value for the one or more linked solution artifacts from the plurality of solution artifacts of the information integration project.

5. The computer-implemented method of claim 1, further comprising:
determining a possibility of one or more paths between topology elements in the topology, based on the respective linked one or solution components for each of the topology elements.

6. A computer-implemented method to provide an information landscape for topology modeling, linking, and validation for an information integration project, the information landscape comprising a topology of topology elements representing aspects of the information integration project, the computer-implemented method comprising:
providing an information integration program comprising a plurality of components including a topology component, a linking component, and a validation component;
generating the topology by the topology component and based on a palette of landscape elements;
linking, by the linking component, each topology element to a respective one or more solution artifacts from a plurality of solution artifacts for the information integration project, wherein the plurality of solution artifacts includes at least one of a database, a logical data model for a database, and a database schema;
linking each topology element to a respective one or more requirements from a plurality of requirements for the information integration project;
determining, by the validation component, a degree to which one or more business metrics are realizable, wherein the one or more business metrics are generated by the validation component based on: (i) the plurality of solution artifacts for the information integration project; (ii) the information landscape; and (iii) the linking between each of the topology elements in the topology and the one or more solution artifacts;
determining an adequacy value for the one or more linked solution artifacts from the plurality of solution artifacts of the information integration project;
upon receiving a request from a user to generate a solution sketch for the information landscape, determining a class of users to which a user is assigned, based on an electronic user identifier corresponding to the user;
determining a viewpoint having a predefined association with the class of users to which the user is assigned;
selecting only a portion of the plurality of solution artifacts to depict, based on the viewpoint having a predefined association with the class of users to which the user is assigned;
automatically generating the solution sketch, for the user, based on the topology, wherein the solution sketch comprises a graphical representation of the information landscape for the information integration project, wherein the solution sketch includes depictions of solution artifacts for the selected portion of the plurality of solution artifacts, wherein the solution sketch is generated based on: (i) the linking of the topology elements to the solution artifacts, and (ii) the viewpoint having the predefined association with the class of users to which the user is assigned; and
outputting the solution sketch for display.

7. The computer-implemented method of claim 6, further comprising:
validating at least one of:
(i) the plurality of solution artifacts for the information integration project;
(ii) semantics of the information landscape based on the topology of topology elements; and
(iii) semantics of the linking between each of the topology elements in the topology and the one or more solution artifacts.

8. The computer-implemented method of claim 6, further comprising:
determining an adequacy value for the one or more linked solution artifacts from the plurality of solution artifacts of the information integration project.

9. The computer-implemented method of claim 6, further comprising:
determining a possibility of one or more paths between topology elements in the topology, based on the respective linked one or solution components for each of the topology elements.

10. The computer-implemented method of claim 1, wherein at least one of the plurality of solution artifacts comprises at least one of:
(i) a physical metadata structure;
(ii) a model structure;
(iii) a business definition;
(iv) an operation structure; and
(v) a web resource.

11. The computer-implemented method of claim 10, wherein the physical metadata structure comprises at least one of:
(i) an extract, transform and load (ETL) job design;
(ii) a deployed database schema; and
(iii) a federated query.

12. The computer-implemented method of claim 10, wherein the model structure comprises at least one of:
(i) a logical data model;
(ii) a dimensional model;
(iii) a physical data model; and
(iv) a mapping specification.

13. The computer-implemented method of claim 10, wherein the business definition comprises at least one of:
(i) a requirements specification;
(ii) an ontology element; and
(iii) a taxonomy element.

14. The computer-implemented method of claim 10, wherein the operation structure comprises at least one of:
(i) an extract, transform and load (ETL) job execution; and
(ii) an ETL event.

15. The computer-implemented method of claim 1, wherein the degree to which the one or more business metrics are realizable comprises an affirmative degree to which the one or more business metrics are technically realizable, wherein the linking component includes a requirement linking subcomponent and a solution tool linking subcomponent, wherein the requirement linking subcomponent links topology elements with one or more requirements from a plurality of requirements of the information integration project, wherein the solution tool linking subcomponent links the topology elements with one or more solution components;
wherein the topology component includes a business tools subcomponent and a technical tools subcomponent, wherein the business tools subcomponent creates and modifies business components and business metrics used in validating the information integration project, wherein the technical tools components creates and modifies solution components and viewpoints;
wherein the validation component validates each of: (i) the plurality of solution artifacts for the information integration project; (ii) semantics of the information landscape based on the topology of topology elements; and (iii) semantics of the linking between each of the topology elements in the topology and the one or more solution artifacts.

16. The computer-implemented method of claim 15, further comprising:
prior to determining the degree to which the one or more business metrics are realizable, generating the one or more business metrics by the validation component based on: (i) the plurality of solution artifacts for the information integration project; (ii) the information landscape; and (iii) the linking between each of the topology elements in the topology and the one or more solution artifacts; and
linking each topology element to a respective one or more requirements from the plurality of requirements for the information integration project;
wherein the one or more business metrics are generable based on each aspect selected from:
(i) the topology of topology elements;
(ii) the plurality of solution artifacts; and
(iii) the linking between one or more topology elements in the topology and the one or more solution artifacts.

17. The computer-implemented method of claim 16, wherein the topology elements are selected from the palette of landscape elements, wherein a first landscape element of the palette of landscape elements contains one or more sub-elements;
wherein the computer-implemented method further comprises:
determining, for at least one topology element in the topology, an adequacy value for the one or more linked solution artifacts from the plurality of solution artifacts of the information integration project; and
determining a possibility of one or more paths between topology elements in the topology, based on the respective linked one or solution components for each of the topology elements;
wherein the plurality of solution artifacts includes each of:
(i) a physical metadata structure;
(ii) a model structure;
(iii) a business definition;
(iv) an operation structure; and
(v) a web resource.

18. The computer-implemented method of claim 17, wherein the physical metadata structure comprises each of:
(i) an extract, transform and load (ETL) job design;
(ii) a deployed database schema; and
(iii) a federated query.

19. The computer-implemented method of claim 18, wherein the model structure comprises each of:
(i) a logical data model;
(ii) a dimensional model;
(iii) a physical data model; and
(iv) a mapping specification.

20. The computer-implemented method of claim 19, wherein the one or more business metrics comprise a customer profitability metric, wherein the business definition comprises each of:
(i) a requirements specification;
(ii) an ontology element; and
(iii) a taxonomy element;
wherein the operation structure comprises each of:
(i) an ETL job execution; and
(ii) an ETL event;
wherein the computer-implemented method comprises generating a respective solution sketch from a respective information landscape for each information integration project type selected from:
(i) a data warehouse project;
(ii) a data integration project;
(iii) a data quality project;
(iv) a business intelligence project; and
(v) a master data management project.

* * * * *